(No Model.)
G. A. BROWN.
THILL COUPLING.
No. 501,052.  Patented July 11, 1893.
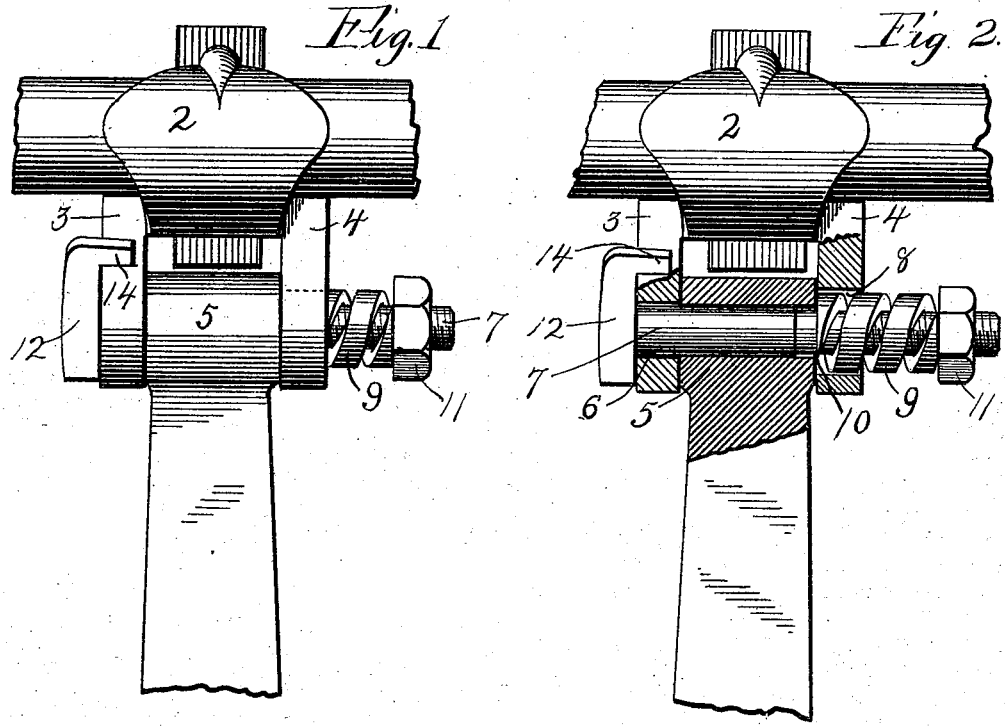
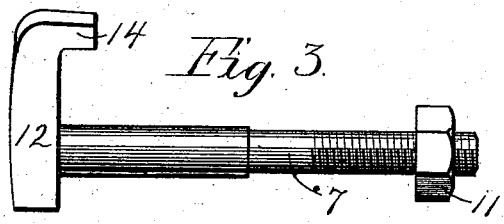
Witnesses.
G. E. Purple
C. J. Hawley
Inventor
George A. Brown
by Paul Merwin
His Atty's.

UNITED STATES PATENT OFFICE.

GEORGE A. BROWN, OF MINNEAPOLIS, MINNESOTA.

THILL-COUPLING.

SPECIFICATION forming part of Letters Patent No. 501,052, dated July 11, 1893.

Application filed May 25, 1892. Serial No. 434,242. (No model.)

*To all whom it may concern:*

Be it known that I, GEORGE A. BROWN, of Minneapolis, in the county of Hennepin and State of Minnesota, have invented a certain new and Improved Thill-Coupling, of which the following is a specification.

My invention relates to improvements in thill couplings with anti-rattler attachments and its object is to so construct a device of this class that it will possess all of the strong features of the ordinary coupling and at the same time effectually prevent the rattling of the parts.

To this end my invention consists generally in the constructions and combinations hereinafter described and particularly pointed out in the claim, and will be more readily understood by reference to the accompanying drawings, forming a part of this specification, in which—

Figure 1 is a plan view of a thill coupling embodying my invention. Fig. 2 is a similar view with portions of the shackle and the thill eye broken away to show the bolt and compression spring. Fig. 3 shows the bolt detached and Fig. 4 shows the spring detached.

As shown in the drawings, the shackle is of the common construction having the loop 2 bolted upon the axle and the two arms or lugs 3 and 4. The eye 5 is also of the common construction. These parts are made in quantities by the factories and when received by the carriage maker or blacksmith having holes in the lugs 3 and 4 of just the size of the shackle bolt. I leave the hole 6 in the lug 3 in this way to hold the bolt 7 but I enlarge the hole in the other lug to make the hole 8 just large enough to freely admit the circular coiled spring 9 surrounding the threaded end of the bolt and projecting in against the end 10 of the eye so that when the nut 11 is tightened the flat end of the spring is forced firmly against the eye pressing the same so strongly against the opposite lug as to effectually prevent rattling of the eye in the shackle or on the bolt. The bolt differs from the common one, not only in being longer to accommodate the spring and nut, but also has the T-head 12 bearing on the outer side of the lug 3 and having the finger 14 lapping over the edge thereof to prevent the turning of the bolt. The outer end of the spring pressing on the inside of the nut locks the same on the bolt.

It will be seen that my coupling has the strong double bearing in the shackle to prevent the bending of the bolt as the forward pull on the end thereof is taken up by and between the bolt and the wall of the large hole. The spring is preferably made out of wire or rod but may if desired be coiled from round material.

The other advantages of my device lie in its cheapness, its compactness, and in its durability.

Having thus described my invention, I claim as new and desire to secure by Letters Patent—

The combination with the shackle having the lugs 3 and 4 provided with the small and large holes respectively, of the thill eye, the shackle bolt, the T-head of said bolt having the finger 14 to engage the edge of the lug 3, the coiled spring 9 on the threaded end of the bolt, and the nut 11 for forcing said spring into engagement with the eye whereby the latter is pressed firmly against the lug 3 and thereby prevented from rattling, substantially as described.

In testimony whereof I have hereunto set my hand this 21st day of May, A. D. 1892.

GEORGE A. BROWN.

In presence of—
 CHAS. G. HAWLEY,
 FREDERICK S. LYON.